Patented Aug. 9, 1932

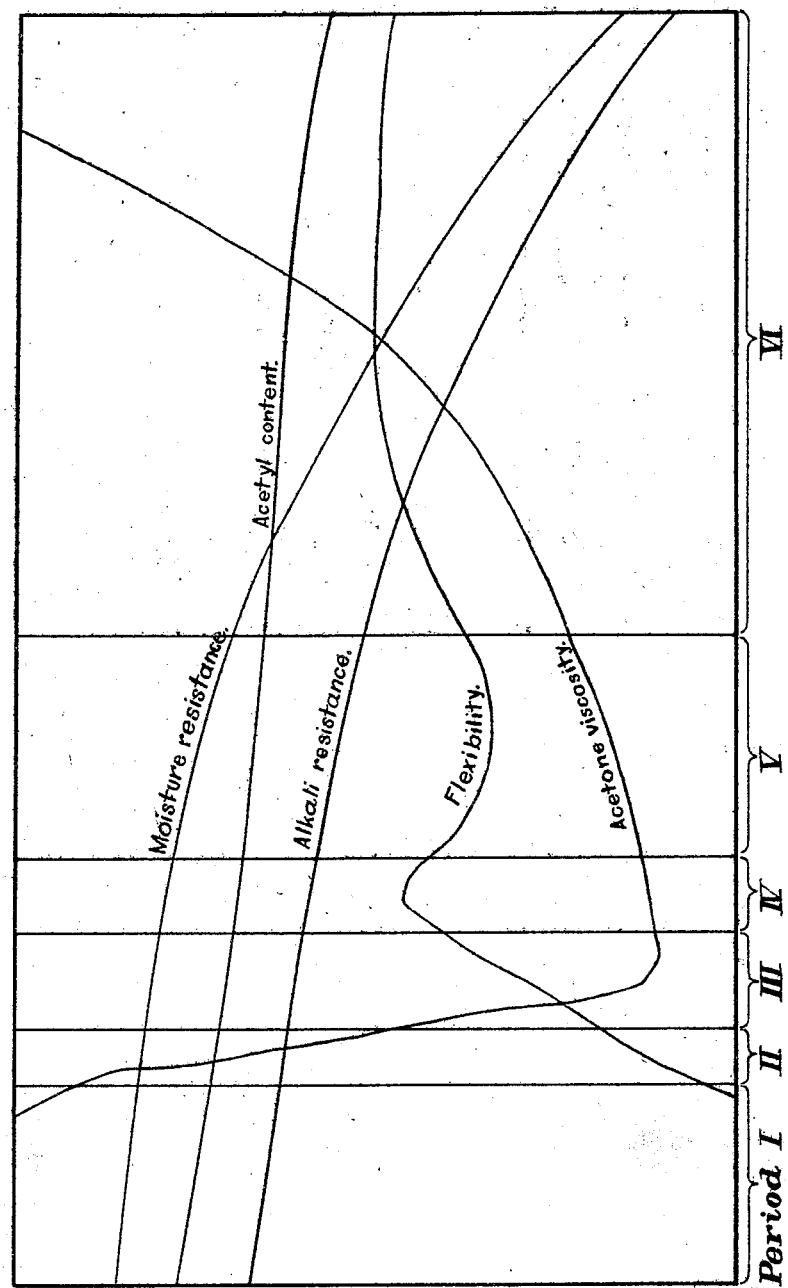

1,870,635

UNITED STATES PATENT OFFICE

CARL J. MALM, OF ROCHESTER, NEW YORK, ASSIGNOR TO EASTMAN KODAK COMPANY, OF ROCHESTER, NEW YORK, A CORPORATION OF NEW YORK

TREATMENT OF CELLULOSE ACETATE

Application filed May 3, 1930. Serial No. 449,388.

This invention relates to a process for the treatment of cellulose acetate, and particularly to a process for changing the solubility of cellulose acetate.

Cellulose acetate, as usually prepared at the present time by acetylating cellulose in a bath containing acetic anhydride, acetic acid, and a catalyst, consists essentially in cellulose triacetate which is generally soluble in chloroform, although in some instances it is prepared insoluble in chloroform. In order to render this cellulose triacetate useful in the art, it is often desirable to change its solubility to, for example, acetone solubility as products prepared from acetone solutions have improved physical properties for most technical uses.

Various expedients have been devised for changing the solubility of the cellulose triacetate to the solubility in the solvent it is desired to use. It is, of course, desirable in such a reaction that the cellulose acetate be not degraded, for if degradation of the cellulose acetate does occur the resultant film or other product obtained from such a cellulose acetate will be of inferior quality. In my copending U. S. application 325,597, I have described a process for changing the solubility of cellulose acetate in which there is practically no degradation of the cellulose esters.

As is stated in that application, cellulose acetate having slight if any degradation is obtained by effecting the deacetylation of the cellulose in suitable hydrolyzing baths at temperatures of 70° to 80° Fahrenheit or thereabouts. By effecting the treatment at such a temperature, not only is an undegraded cellulose acetate obtained, but due to the long time required to bring about the partial deacetylation of the cellulose acetate a uniform product is obtained and accurate control of the reaction is realized. There is, of course, a disadvantage in effecting the reaction at such low temperatures, however, in that the time is greatly extended with the resultant tie-up of materials and increased cost of the product.

An object of the present invention is to carry out the partial deacetylation of cellulose acetate without appreciable degradation of the cellulose molecule. A further object of this invention is to effect deacetylation in such a manner that the cellulose ester is uniformly treated. Another object of this invention is to effect undegraded partial deacetylation of the cellulose esters in a much shorter time than is required in the process described in the above mentioned application. Still another object is to effect such a partial deacetylation under good control. Other objects will hereinafter appear.

I have found that the time required for completing the partial de-esterification of cellulose acetate can be considerably shortened over the time required in my copending application 325,597 without sacrificing the quality of the cellulose acetate obtained by such a reaction, by first treating the cellulose acetate at a somewhat elevated temperature, in order to increase the velocity of the deacetylation reaction, and then just prior to the time when the optimum deacetylation has been reached, lowering the temperature and thereby decreasing the rate of the deacetylation reaction whereby the reaction can be stopped at the desired point with facility.

In conducting the hydrolysis of cellulose acetate by my process, I have found that the first stages of this reaction may be effected at a temperature above 80° F. It must be borne in mind, however, that this period of hydrolysis must not be at a temperature sufficiently high to degrade the cellulose acetate and I have found that a temperature in the neighborhood of 100° Fahrenheit gives excellent results, while under no circumstances, however, should the temperature be increased much in excess of 150° Fahrenheit as marked degradation of the product will result with a resultant poor final product.

When the hydrolysis of the cellulose acetate has almost reached the stage where it should be stopped, I have found that it is advisable to lower the temperature to approximately the normal hydrolysis temperature, which will be considered herein as in the neighborhood of about 80° Fahrenheit; if it be desired to extend even further this latter period of the reaction which may be required due to the lack of sufficient apparatus to precipitate the finished product, or for other reasons, a temperature of 65° F. may be employed. By so lowering the temperature at this stage of the reaction the velocity or reaction rate of the deacetylation is retarded thus enabling the operator to sample his hydrolyzing batch, determine the degree of acetyl contained therein or other governing factors, and still have plenty of time to stop the reaction before it has gone appreciably beyond the stage which he has determined.

It will be readily realized, therefore, that my process combines both the economy derived from the effecting the acetylation at a high temperature, whereby the time for carrying out the particular deacetylation is decreased, from the time required by my former process, and uniformity of products together with the accuracy of control realized by the lower temperature treatment. By my process, therefore, I have been able to obtain, for example, from chloroform soluble cellulose acetate, acetone soluble cellulose acetate in a matter of three to four days. Heretofore it has been necessary to carry on such a process for fifteen to twenty days if the same accuracy of control and quality of cellulose acetate was desired, for example as by the process of my co-pending application No. 325,597.

I will now describe an example for carrying out my process, but it will be understood that any type of hydrolyzing bath may be employed in lieu of the one herein described, and that I will not, therefore, be restricted by the particular bath herein shown except as may be indicated in the claims appended hereto.

To 580 parts of a solution, consisting of 80 parts by weight of cellulose triacetate (44.8% acetyl) as described in the U. S. patent of Gray and Staud, No. 1,683,347 granted September 4, 1928, 500 parts of substantially glacial acetic acid and approximately one part of sulphuric acid and 3 parts of phosphoric acid, is added a mixture of 37 parts of water and 60 parts of glacial acetic acid. The resulting solution consists of 80 parts of cellulose triacetate in 597 parts of 94% acetic acid with less than 1/5 of 1% sulphuric acid and less than 6/10 of 1% of phosphoric acid.

If a product is desired which corresponds to "Period II" as described in my copending application, the hydrolysis may be carried out at a temperature of 100° F. for 80 hours. The temperature is then dropped to, for instance, 80° F. where it is kept for a period of approximately 12 hours longer or until the control methods show that the right acetyl content has been reached.

The "periods" are described in my co-pending application. It will be sufficient here to briefly explain the single figure and the import of the various periods,—the abscissæ are graduated in intervals of time the ordinates into several scales covering acetyl content, moisture resistance, alkali resistance, flexibility, and acetone viscosity. Each period produces cellulose acetate having qualities differing from the cellulose esters hydrolyzed for another period. If hydrolysis of a cellulose acetate having an acetyl content of 44.8% is conducted as described in the above example and at a temperature of 70° F. "Period I" develops in from the first to the fifteenth day. The acetyl content is gradually reduced from 44.8% to 41.5%. "Period II" develops in the fifteenth to the twentieth day, during which period the acetyl content falls from 41.5% to 41%; the cellulose acetate product obtained from the evaporation of a solution containing the cellulose acetate prepared during this period has a high resistance to moisture. The cellulose acetate likewise has a high viscosity in acetone solutions, but toward the end of this period this viscosity rapidly falls off. "Period III" constitutes the twentieth to twenty-seventh day in which the acetyl content falls from 41% to 40.5%, the resistance to moisture and resistance to alkali is very high though decreasing slightly, acetone solubility passes through a minimum and flexibility increases rapidly. "Period IV" runs from the twenty-seventh to the thirty-third day, in this period the acetyl content continues to fall from 40.5% to 40%. The resistance to moisture and alkali continues high but is gradually decreasing, while acetone solubility is low but steadily rising.

"Period V" runs from the thirty-third to the fiftieth day, in which the acetyl content falls from 40% to 38%, resistance to moisture and alkali fall with increasing rapidity, but are moderately high. Acetone viscosity rises steadily and flexibility becomes somewhat less in the first part of the period and then rises somewhat, although it is moderately high throughout. "Period VI" beyond the fiftieth day acetyl content decreases, being about 34% at the end of one hundred days. The resistance to moisture and alkali decreases rapidly, while acetone viscosity increases rapidly, becoming extremely high. Flexibility likewise increases and remains at this high value. A slight variation in manipulation will change correspondingly the time at which a given "period" is reached.

If a product corresponding to "III" is desired, the first part of the hydrolysis is carried out for 100 hours at 100° F. and the second part of the hydrolysis at 80° F. for another period of approximately 10 to 12 hours; if a product corresponding to "IV" is desired the first period would be conducted for 110 hours under the same conditions; for "V" the first period should require approximately 130 hours and for "VI" 160 hours. By increasing the temperature above 100° F. but not to the point at which the cellulose acetate is appreciably degraded, the time may be considerably shortened. At a temperature of 100° F., however, I have found that excellent results may be realized.

The above plans for treatment are not, of course, fixed, it being left entirely to the operator when the first period be discontinued and the second period started. It is only advisable that a sufficient length of time be allowed at the lower temperature to give the operator ample time for testing the product.

From a consideration of the above description it will be realized that any process for the hydrolysis of cellulose acetate in which that hydrolysis is conducted in two stages and in which the first stage is conducted at a higher temperature than the second stage, will come within the scope of this invention without in any way sacrificing the advantages that may be derived therefrom.

What I claim as my invention and desire to be secured by Letters Patent of the United States is:

1. A process for changing the solubility of cellulose acetate which comprises conducting the hydrolysis during the first part of the solubility change at an accelerated rate and, prior to stopping the hydrolysis, at a slower rate.

2. A process for changing the solubility of cellulose acetate which comprises conducting the hydrolysis at a temperature above the normal hydrolysis temperature and, prior to stopping the hydrolysis, lowering the temperature.

3. A process for changing the solubility of cellulose acetate which comprises conducting the hydrolysis at a temperature above the normal hydrolysis temperature, but below the temperature at which the cellulose acetate is degraded and, prior to stopping the hydrolysis, lowering the temperature.

4. A process for changing the solubility of cellulose acetate, which comprises conducting the first period of the hydrolysis at a temperature of from 80° to 150° F. and, prior to stopping the hydrolysis, lowering the temperature to below 80° F.

5. A process for changing the solubility of cellulose acetate which comprises conducting the hydrolysis at a temperature of 100° F. and, prior to stopping the hydrolysis, lowering the temperature to 70° F.

Signed at Kingsport, Tennessee, this 22nd day of April 1930.

CARL J. MALM.